(12) United States Patent
Tripathi et al.

(10) Patent No.: US 7,672,239 B1
(45) Date of Patent: Mar. 2, 2010

(54) SYSTEM AND METHOD FOR CONDUCTING FAST OFFLOADING OF A CONNECTION ONTO A NETWORK INTERFACE CARD

(75) Inventors: Sunay Tripathi, San Jose, CA (US); Hsiao-Keng J. Chu, Palo Alto, CA (US); Nicolas G. Droux, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1194 days.

(21) Appl. No.: 10/884,791

(22) Filed: Jul. 1, 2004

(51) Int. Cl.
*G01R 31/08* (2006.01)
(52) U.S. Cl. .................. 370/235; 370/463; 709/250
(58) Field of Classification Search .......... 370/241, 370/235, 463; 709/250
See application file for complete search history.

(56) References Cited

U.S. PATENT DOCUMENTS 6,807,269 B1 * 10/2004 Atwood et al. ......... 379/220.01
2002/0156927 A1 * 10/2002 Boucher et al. ............ 709/250
2003/0067903 A1 * 4/2003 Jorgensen .................. 370/338
2004/0243723 A1 * 12/2004 Davis et al. ................ 709/250
2005/0204058 A1 * 9/2005 Philbrick et al. ........... 709/238
2006/0136570 A1 * 6/2006 Pandya ...................... 709/217

* cited by examiner

*Primary Examiner*—Kevin C Harper
*Assistant Examiner*—Sai-Ming Chan
(74) *Attorney, Agent, or Firm*—Osha • Liang LLP (57) ABSTRACT

Techniques, systems, and apparatus for offloading data connections from a kernel onto an associated TNIC are disclosed. Generally, embodiments of the invention are configured to send message packets of a connection to an endpoint at substantially the same time as an associated offload set-up process is performed. A method provides a data connection enabling data exchange between two TCP endpoints. After a determination is made that the connection is suitable for offloading, the kernel sends connection state information and a request that the connection be offloaded to a TNIC. Prior to completion of offload set up, an initial transmission of connection data is sent to an associated TCP endpoint. These principles can be implemented as software operating on a computer system, as a computer system module, as a computer program product and as a series of related devices and products.

34 Claims, 4 Drawing Sheets

SYSTEM AND METHOD FOR CONDUCTING FAST OFFLOADING OF A CONNECTION ONTO A NETWORK INTERFACE CARD

BACKGROUND OF THE INVENTION

Conventionally employed computer systems commonly include a TCP (Transmission Control Protocol) processing layer and an IP (Internet Protocol) layer as part of the kernel to facilitate the transmission and receipt of data over a networked system. Network Interface Cards (NIC's) are commonly used to enable computers to be connected with other systems in a network.

Commonly, when message packets arrive at a receiving computer system they are processed by the TCP and IP layers of the kernel (i.e., the network protocol stack)(also referred to as the TCP/IP stack). With the steadily increasing capabilities of modern NIC's, throughput of on the order of 1 Gb/s (gigabit per second) is possible. Although advantageous from a data transfer perspective, such high data transfer rates can, and often, do overwhelm the kernel. In fact, the processing in the TCP layer and IP layer can so occupy the kernel, that in many cases, the kernel spends between 70 and 80 percent (or more) of the total CPU resources processing packets. Thus, little other data processing can be performed in the CPU. As a result, little processing power remains for the implementation of applications. This can drastically compromise system efficiency.

In an effort to address this problem some companies have constructed NIC's that incorporate ASIC's (Application Specific Integrated Circuits) configured to implement various functions. In particular, some types of NIC's use an on-card ASIC to perform TCP processing to enable communication with other systems connected with a network. These NIC's are sometimes called TNIC'S. When long message streams are to be received by a computer system, the processing of these messages can, in some circumstances, be offloaded onto the TCP and IP layers of the TNIC. In such circumstances the TNIC can relieve some of the TCP/IP processing burden from the kernel of the CPU. Thus, offloading simply amounts to transferring TCP/IP processing from the kernel to an associated TNIC card.

Commonly, the kernel accepts a connection and then offloads the TCP/IP processing during a data transfer phase of message processing. For purposes of this patent a connection refers to a message stream established between two communication endpoints. In a connection, the endpoints can operate as a remote endpoint (at some distant non-local node) and a local endpoint (generally operating locally on a host CPU). In a connection the endpoints are configured to allow the exchange of data between the endpoints. These endpoints are commonly identified using unique IP addresses and unique port identifiers. Data is exchanged between the endpoints, for example, as message streams comprising sequences of data packets that are transmitted between the endpoints.

As stated briefly above, TCP/IP processing of these message streams of these connections can be offloaded from the kernel onto a TNIC during a data transfer phase of message processing. Unfortunately, the offloading of such connections from the kernel to the systems of the TNIC can be very time intensive. Commonly, the set-up for such offloading requires allocating resources in the TNIC driver and other hardware as well as synchronizing a connection state across various data structures. This set-up process is time consuming, commonly taking on the order of several milliseconds (ms) (generally in the range of about 10-15 ms) to set-up and offload the connection onto the TNIC for subsequent processing. This makes such offloading very useful for long-lived connections, but is less useful for very short-lived connections. Internet and web-based message commonly have short connections (e.g., commonly lasting on the order of a few milliseconds). Under such conditions, the set-up time required to offload the message traffic onto a TNIC is longer than the transmission time for the entire internet-based message. In other words, offloading the connection onto the TNIC actually takes longer that the entire transmission time for the stream of message packets comprising the message and does not provide any real relief for the kernel. Thus, in conventional implementations, the TCP/IP layers of the TNIC cannot effectively accommodate the need for offloading of short-lived connections (e.g., internet and web-based connections) and therefore do not substantially reduce the processing burden on the kernel. In addition, a NIC may be incapable of supporting some network connections that require special processing capabilities. Consequently, using the TNIC to handle all network connections in accordance with conventional methods can be counter-productive to performance. Additionally, with web-based (internet) message traffic growing on a daily basis, any mode of operation for a computer system (including TNIC) that can relieve the kernel of some of the TCP/IP processing burden for short-lived connections (e.g., internet message packets) will substantially enhance performance in the CPU.

SUMMARY OF THE INVENTION

Broadly speaking, the invention relates to techniques, systems and apparatus for conducting high-speed offloading of a connection onto a TNIC The invention can be implemented in numerous ways, including a systems, software modules, methods, or a computer program products as well as other implementations. Several embodiments of the invention are discussed below.

One embodiment of the invention is directed to a method for offloading a data connection from a kernel onto an associated TNIC. Generally, the method involves sending message packets of a connection to an endpoint at substantially the same time as an associated offload set-up process is performed. The offload set-up enabling the connection to be transferred from the kernel to an associated TNIC for processing.

One method embodiment involves providing a data connection that enables a message stream to be transmitted between a local TCP endpoint and a remote TCP endpoint and determining if the connection is suitable for offloading from the kernel onto the TNIC for processing. For a suitable connection an offload request is sent to the TNIC. Typically, the request includes connection state information and a request that the connection be offloaded from the kernel to the TNIC. Prior to receiving an acknowledgement of the offload request, an initial transmission of data is sent to the remote TCP endpoint.

In another embodiment, the disclosure teaches a computer program product embodied in a computer readable media that includes code for offloading a data connection from a kernel onto an associated TNIC. The product including instructions for providing a data connection, wherein the connection enables a message stream to be transmitted between a local TCP endpoint and a remote TCP endpoint and for determining if the connection is suitable for offloading from the kernel onto the TNIC for processing. For a suitable connection, the product includes instructions for sending an offload request from the kernel to the TNIC, the request including connection state information and a request that the connection be offloaded from the kernel to the TNIC. The product includes code instructions for sending an initial transmission of data to the remote TCP endpoint, prior to receiving an acknowledgement of an offload request from the TNIC, wherein the initial transmission comprises at least a portion of the message stream.

In another embodiment, the principles of the present invention enable a computer system enabling the offloading of connections from a kernel to a TNIC in accordance with the principles of the invention. The computer system including at least one central processing unit (CPU) having a TCP/IP stack operating in a CPU kernel. The system includes a TNIC having a TCP/IP stack configured to enable processing of data sent to and received from remote endpoints and a media access controller (MAC) that enables a data connection that allows a message stream to be transmitted between a local TCP endpoint and a remote TCP endpoint. The TNIC further includes an offload engine configured to offload the data connection from the kernel onto the TNIC. The offload engine including a connection analyzer, an offload request transmission mechanism, and a data transmission mechanism for sending an initial transmission of data from the kernel to the remote TCP endpoint, prior to receiving an acknowledgement of an offload request from the TNIC, wherein the initial transmission comprises at least a portion of the message stream.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

It is to be understood that in the drawings like reference numerals designate like structural elements. Also, it is specifically pointed out that the depictions in the drawings are not necessarily to scale.

DETAILED DESCRIPTION OF THE INVENTION

The invention relates to techniques, systems, and methods for conducting offloading a connection onto a TNIC. Embodiments of the invention are discussed below. However, those skilled in the art will readily appreciate that the detailed description given herein with respect to these figures is for explanatory purposes as the invention extends beyond these limited embodiments.

Embodiments of the present invention include methods, computer readable instructions, systems, and apparatus for reducing the delay's caused by conventional offload preparation processes used to offload connections onto a TNIC. Thus, embodiments of the invention present improved set-up processes for the offloading of a connection from kernel to NIC. Such processes make the offloading of short-lived connections to a NIC a feasible and beneficial alternative to processing in the kernel. Embodiments of the invention accomplish this by achieving a decreased set-up time enabled by re-sequencing the set-up events and adding various operations.

As alluded to above, one limitation of conventional offloading processes is that they are not particularly practical for use in offloading short-lived connections. For such connections, the temporal overhead (latency) involved in merely setting up a connection for offloading is prohibitive. For longer connections this has not been a problem. However, for short-lived connections, the time spent in setting up some of these offloading processes can be longer than the message itself. Heretofore, such short-lived messages are still processed using the TCP/IP layers of the kernel rather than offloaded. However, computers are subjected to ever increasing amounts of web-based (internet) traffic. The vast majority of web-based (internet) connections are short-lived. As such they represent an ever increasing burden on the processing time of the kernel. Heretofore, the latency problems involved in setting up offloading have made it impractical to offload the vast majority of web or internet based connections.

One of the difficulties presented by the current state of the art is that in order to offload a connection a lengthy set up process must be completed first. Until the setup is complete the kernel stops processing the connection and no data is transmitted by the connection. Moreover, when data transmission does begin, it is slowed considerably by the so called TCP slow start protocol which permits only small amounts of data to be sent in the initial phases of data transmission. This presents a considerable delay in connection offloading and wastes valuable kernel processing time.

Embodiments of the present invention address some of the difficulties presented by conventional offloading processes. In particular, embodiments of the invention do not stop processing the data of the connection during the offload set up process. While an offload set up is being conducted embodiments of the invention continue to transmit and process connection data. Thus, some of the latency period involved in setting up the offload is not lost. In particular, the latency period for the first packets of any connection is substantially decreased. Although these features are helpful for all offloading, they are particularly useful for offloading connections comprising sequences of about 30 or fewer data packets. More particularly, they are useful for offloading connections short-lived connections comprising in the range of about 6-18 data packets which make up a large proportion of internet based connections. Therefore, although this invention finds particular utility for offloading connections comprising sequences of about 30 or fewer data packets or message streams of less than about 45 kilobytes (kB), it is not limited to such.

In order to better illustrate some of the properties of the embodiments of the invention, reference is hereby made to FIGS. 1-5 and the supporting paragraphs.

Figure 1:
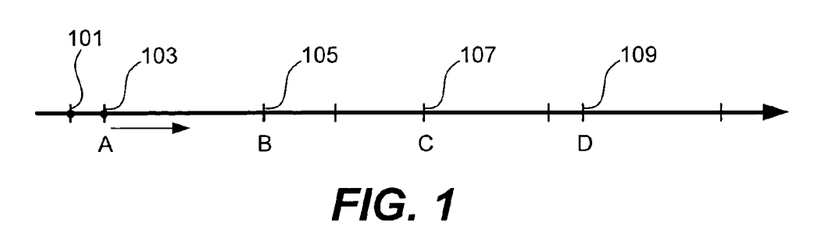
FIGS. 1, 2, and 3A are simplified timing diagrams that contrast the embodiments of the invention with conventional approaches for offloading connections.
Figure 2:
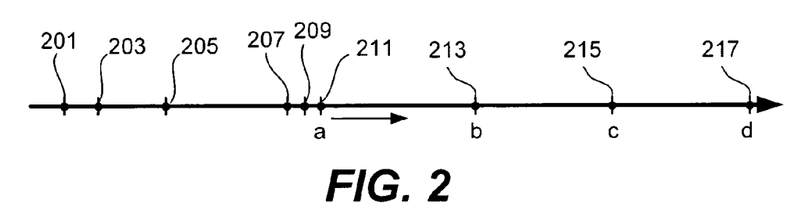
Figure 3A:
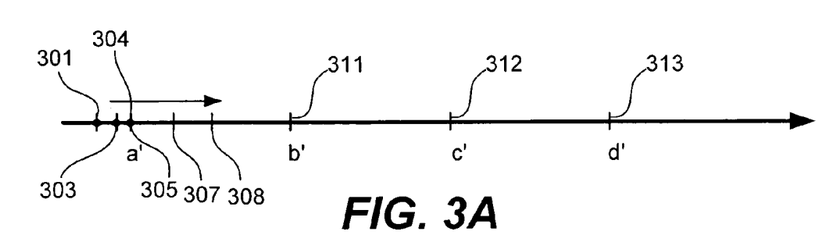

Reference is now made to FIGS. 1, 2, and 3A which are simplified timing diagrams that are used to illustrate some of the differences between the embodiments of the invention and conventional offloading processes.

FIG. 1 is a simplified timing diagram that illustrates a conventional approach to TCP/IP processing of messages. Such processing is accomplished by the TCP/IP stack of a CPU kernel without offloading such processing onto a TNIC. In a conventional computing system a CPU can be interfaced with one or more NIC's or TNIC's which receive messages from a network. A conventional offloading process begins with a data transmission message to or from a remote end point. A standard three-way handshake is used to establish a connection that allows a message stream comprising data packets to be sent between a local endpoint and the remote endpoint (Step 101). As is known to those having ordinary skill in the art such handshakes are used to establish a connection between two uniquely identified endpoints (e.g., identified by a unique IP address and unique port identifier for each endpoint) and identify the message stream being sent. Thus, a connection identifies two endpoints configured to allow the exchange of data between the endpoints. Commonly, the connection is used to transmit a message stream. One example of a typical set of endpoints would be a client machine and a server machine.

After the handshake, the kernel processes incoming and outgoing data in the connection using the TCP/IP layer of the kernel. For example, the TCP/IP layer of the kernel processes outgoing message packets and the kernel sends the outgoing data to a remote endpoint (Step 103). Typically, not all data in the connection is sent at this time. A "TCP slow-start" protocol is used to "ramp up" the amount of data sent. "TCP slow-start" protocols require that small initial data transmissions (i.e., 2-4 maximum segment size (MSS) be sent before larger portions of data can be sent. Thus, data is sent in segments of steadily increasing size. In the depicted example, the messages are sent to the remote endpoint where they are received. For successfully received messages, the remote endpoint sends an associated acknowledgement message (ACK). Once this ACK is received by the local endpoint a larger message segment can be sent (Step 105). For example, if the initial data sent (at point A) comprises three (3) data packets, a further message can be sent having six (6) data packets (e.g., at Step 105) (at point B). The time between Step 103 and Step 105 (time between message sent, ACK received, and subsequent message sent) is commonly referred to as "round-trip time" and commonly takes about 10 ms messages on the internet.

The same process is repeated for a next series of message packets. For example, a six packet message is sent at Step 105 where they are received at the remote endpoint that sends ACK messages for successfully received messages. After receiving the ACK, the local endpoint sends a larger message segment (Step 107) (at point C). For example, if the previously sent data comprised six (6) data packets, a further message can be sent having twelve (12) data packets (i.e., at Step 107). After ACK's associated with the next 12 data packets are received a further 24 data packets can be processed and sent (Step 109) (at point D). If, for example, the connection comprises a message stream 45 packets long (i.e., 3, 6, 12, 24) the connection processing is completed. The processing time expended by the kernel to process and send an example 45 packet message connection typically comprises about 40 ms (e.g., about 10 ms for the handshake, about 10 ms time expended between 103 and 105, about 10 ms time expended between 105 and 107, and about 10 ms time expended between 107 and 109). It has been noted that if long-lived connections could be off-loaded onto the TNIC, considerable processing time could be made available to process other applications.

FIG. 2 is a simplified timing diagram that illustrates a conventional offloading process. In a conventional computing system a CPU can be interfaced with one or more NIC's or TNIC's. As before, a conventional offloading process begins with a data transmission message to or from a remote end point. A standard three-way handshake (Step 201) is used to establish that a message stream comprising data packets can be sent between a local endpoint and the remote endpoint (the connection). As before, the handshake establishes the connection between two uniquely identified endpoints and identifies the message stream being sent.

In accordance with any one of a number of established techniques known to those having ordinary skill in the art the kernel determines that the connection is suitable for offloading onto the TNIC (i.e., that the message stream of the connection is suitable for offloading onto the TCP/IP stack of a TNIC for processing). Commonly, the kernel analyzes information transmitted during the handshake process (which commonly includes the number of packets in (i.e., the length of) the message stream of the connection) and determines that the connection is suitable for offloading. Those having ordinary skill in the art are aware of many methods and techniques that can be used to discern that such connections are suitable for offloading.

After offload suitability is determined, a synchronization state must then be established. This process can take some time. First, the kernel stops all processing for the message stream (Step 203). Second, the kernel updates it own connection state (which was created during the 3 way handshake). This connection state includes the current state of the message stream. This includes information like the number of message packets (packets) in the message stream, the sequence numbers of packets sent and received by the local endpoint as well as the sequence numbers of packets acknowledged as received by the remote endpoint acknowledged as received (or sequence numbers of packets sent to but not yet acknowledged as received by the remote endpoint). Third, the kernel sends an offload request (OFR) to the TNIC (Step 205). The OFR includes a request that the TNIC offload the connection and also the relevant connection state information. Once this information is received by the TNIC the connection state can be synchronized. Fourth, the TNIC processes the OFR. This can be particularly time consuming because the TNIC may be receiving many OFR's at the same time. Under such circumstances all TNIC operations are put into a queue that must be worked through until the OFR is reached. Only then can the OFR be processed. Fifth, once the OFR is processed, the TNIC notifies the TNIC driver of the OFR status (of the connection state). Sixth, the TNIC driver then communicates TNIC status (i.e., an acknowledgement of receipt of the connection state information) to the kernel. Seventh, the kernel now designates the connection as offloaded onto the TNIC for subsequent processing (Step 207). The kernel also starts sending outgoing data for the connection to the TNIC for transmission to the remote endpoint (Step 209). Once the TNIC receives outgoing data from the kernel it begins sending data packets to the remote endpoint (Step 211)(at point a). This is really the beginning of sending packets using the TNIC. As discussed above, this process is additionally slowed due to the "TCP slow-start" protocols requiring small initial data transmissions (i.e., 2-4 maximum segment size (MSS) before larger portions of data can be sent. Additionally, at about this time the kernel also transfers all previously received messages in the connection (that arrived before the offload was completed and are in the queue) to the TNIC for transmission. The accrued time delay engendered in the forgoing steps can result in latency for transmission of the first byte (at a) of on the order of 10-20 ms. Additionally, as previously alluded to, due to the nature of data transmission protocols, initially offloaded data can be transmitted by the TNIC only 2-4 MSS size packets (in accordance with a "TCP slow-start protocol") even though it may have accumulated a substantial number of packets during preparation to offload. This huge delay makes the option of offloading short-lived connections onto a TNIC very unsuitable due to the long set up times required for very short connections. Referring again to the example of FIG. 2, at 211 (i.e., at time a) three packets are sent, at 213 (i.e., at time b) six packets are sent, at 215 (i.e., at time c) twelve packets are sent, at 217 (i.e., at time d) twenty-four packets are sent, and so on. In the case of a 45 packet message stream the connection is completed at 217. Thus, the time involved in accommodating the connection amounts to about 50-60 ms or more (e.g., about 10 ms for the handshake, about 10-20 ms time expended in off load set up (for example, Steps 203-209), 10 ms between 211 and 213, 10 ms time expended between 213 and 215, and 10 ms time expended between 215 and 217). Thus, only for relatively longer messages (e.g., 50 packets or more) does a conventional offloading process make sense.

However, if the TNIC could also be used to efficiently process short-lived messages it could relieve a considerable burden on the CPU kernel processing time, thereby freeing the kernel for increased attention to applications.

Embodiments of the present invention include methods, computer readable instructions, systems, and apparatus for reducing the delay's caused by conventional offload preparation processes used to offload connections onto a TNIC. Thus, embodiments of the invention present improved set-up processes for offloading connection from kernel to NIC. Such processes make the offloading of short-lived connections to a NIC a feasible and beneficial alternative. Embodiments of the invention accomplish this decreased set-up time by re-sequencing the set-up events and adding various operations.

In some embodiments of the invention, initial data from the connection is sent to the endpoint before the offload set up process is completed and before said offload is initiated. This significantly reduces the latency in the first message packets sent for an offloaded connection. As part of initiating an offload, the kernel sends unacknowledged data (data transmitted but not as yet acknowledged as received by the remote endpoint) as well as unsent data (data not previously sent to the remote endpoint) to the TNIC driver so that the TNIC immediately begins accepting message packets (sent by the remote endpoint) from the connection before the offload is completely set up. In this way the TNIC begins receiving and processing incoming message packets before the kernel has completed offloading the connection to the TNIC. Thus, the message packets that would have went into queue in accordance with a conventional offload preparation process are immediately processed by the TNIC without waiting for the offload process to be completed. Also, message packets are set to the remote endpoint by the TNIC without waiting for the offload process to be completed. Thus, data transmission is occurring while the offload set-up process is occurring. Thus, not as much of the set-up time is lost because messages have already been sent to the remote endpoint even though the offload set up process is still in the process of being completed. This stands in marked contrast with conventional offload set up processes which requires that the kernel stop all message processing for the connection while the offload is being set up (i.e., see 203 above). This helpful for offloading short-lived connections (e.g., internet traffic) and at the same time such a process significantly reduces the processing burden on the kernel that was previously imposed by TCP/IP processing for incoming/outgoing net-based traffic.

FIG. 3A presents a simplified timing diagram illustrating an offloading process embodiment constructed in accordance with the principles of the invention. As with a conventional offloading implementation the process begins with a data transmission message to or from a remote end point and a standard three-way handshake used to establish the connection between the local computer and the remote endpoint (Step 301). Then, the kernel determines whether the connection is suitable for offloading. Such a determination can be made using, for example, a number of established techniques known to those having ordinary skill in the art. For example, heuristic analysis of the amount of data to be sent can determine suitability of the connection for offloading on to a TNIC for processing. One or two packet message streams are probably not suitable for offloading onto the TNIC and will still be processed by the TCP/IP layers of the kernel. However, message streams having about 25-30 data packets (or more) are probably long enough to merit offloading onto the TNIC. Although these features are helpful for all offloading, they are particularly useful for offloading connections comprising sequences of about 30 or fewer data packets. More particularly, they are particularly useful for offloading connections comprising 7-15 data packets which make up a large proportion of internet based connections. Thus, this invention, although not limited to such finds particular utility for offloading connections comprising sequences of about 30 or fewer data packets or message streams of less than about 45 kilobytes (kB).

Once a connection is established via a handshake process, the connection state must still be established by the kernel. And the offload must still be performed which involves the TNIC and the TNIC driver establishing their own connection state based on information provided during the offload process and synchronizing their state information with the kernel state information.

However, unlike the heretofore employed processes, the kernel transfers initially received message packets (received from the remote endpoint) to the specified local endpoint (e.g., an intended destination application). And the local endpoint (e.g., application) immediately responds by sending (responsive) connection data to the kernel which is then sent to the remote end point without waiting for the connection to be offloaded to TNIC (Step 303)(at time a'). Thus, the kernel immediately sends an initial transmission of data (received from the application to the remote TCP endpoint, prior to sending OFR request to TNIC or receiving an acknowledgement of an OFR from the TNIC. This initial transmission comprises at least a portion of the message stream. For example, the initial transmission typically comprises the 2-4 packets comprising a TCP slow start worth of data (step 304).

An offload request (OFR) is also sent from the kernel to the TNIC (Step 305), the request including connection state information and a request that the connection be offloaded from the kernel to the TNIC. Along with the OFR, the kernel sends to the TNIC the already transmitted data (e.g., the unacknowledged slow start data from Step 304)) along with any other data that requires transmission to the remote endpoint (typically, any remaining data in the message stream). In order to complete the synchronization process connection state information must be sent to the TNIC and acknowledged as received. Such connection state information sent with OFR typically includes a listing of data packets in the message stream. For example, the listing can include a listing of the packets comprising the sent portion of the message stream sent to the remote endpoint, a listing of the packets of the message stream that have not yet sent to the remote endpoint, a listing of the packets sent to the remote endpoint that have been acknowledged as received by the remote endpoint, and a listing of the packets sent to the remote endpoint that are not yet acknowledged as received by the remote endpoint. Additionally, the listing of data can include sequence numbers of the data packets and data content of the data packets. Additionally, the kernel can track the offload status by indicating that the connection is in the process of being offloaded. So at this point (a') prior to any completion of offload set up, the first message packets have already been sent to the remote endpoint.

If the TNIC supports synchronous offloading the kernel is almost immediately notified that the offload was successful without the need for more (Step 307). In the meantime, the kernel has offloaded processing of outgoing messages onto the TCP/IP layers of the TNIC and continued to send data through the TNIC without waiting for the remote endpoint to acknowledge receipt of data. Thus, the initial data is sent to the remote endpoint by the kernel before the offload setup process is completed and continues while the offload set-up process continues and until an ACK is received by the TNIC that the offload is complete. Once the notification of off-load completion is received by the kernel, the off-load status is indicated as "off-loaded". Thus, during the time the system is awaiting acknowledgement that the remote endpoint has received the initial data (i.e., at time b'), the offload set up continues and no additional latencies are introduced by the off-load set-up process.

If the TNIC does NOT support synchronous offloading, the TNIC informs the kernel of successful offloading using, for example, a call-back function when the offload is completed to inform that the offload was successful (Step 308). The kernel then indicates that the offloading is completed and transfers any acknowledgements (ACK's) received in the interim and also transfers any additional data packets received in the interim to the TNIC for continued operation as an off-loaded connection.

Upon receipt of acknowledgement from the remote endpoint that the initial data packets have been received, further data packets are sent using the TNIC (Step 311)(at time b'). For example, if three packets are sent at 303 (i.e., at time a'), then six packets can be sent at 312 (i.e., at time b'), twelve packets sent at 312 (i.e., at time c'), twenty-four packets sent at 313 (i.e., at time d'), and so on. In the case of an example 45 packet message stream the connection can be completed in, one embodiment, about 40-45 ms (e.g., about 10 ms for the handshake, about 10-15 ms time expended in off load set up, however about 10 ms of this set up time is spent awaiting a response (occurring at b') to the substantially contemporaneous initial data sent at a', with further time spent awaiting ACK's and sending further portions of the message stream (e.g., at c' and d'). Thus, for relatively short-lived messages (e.g., 30 packets or less (even as short as 7-15 packets) such offloading now gains substantial utility.

Figure 3B:
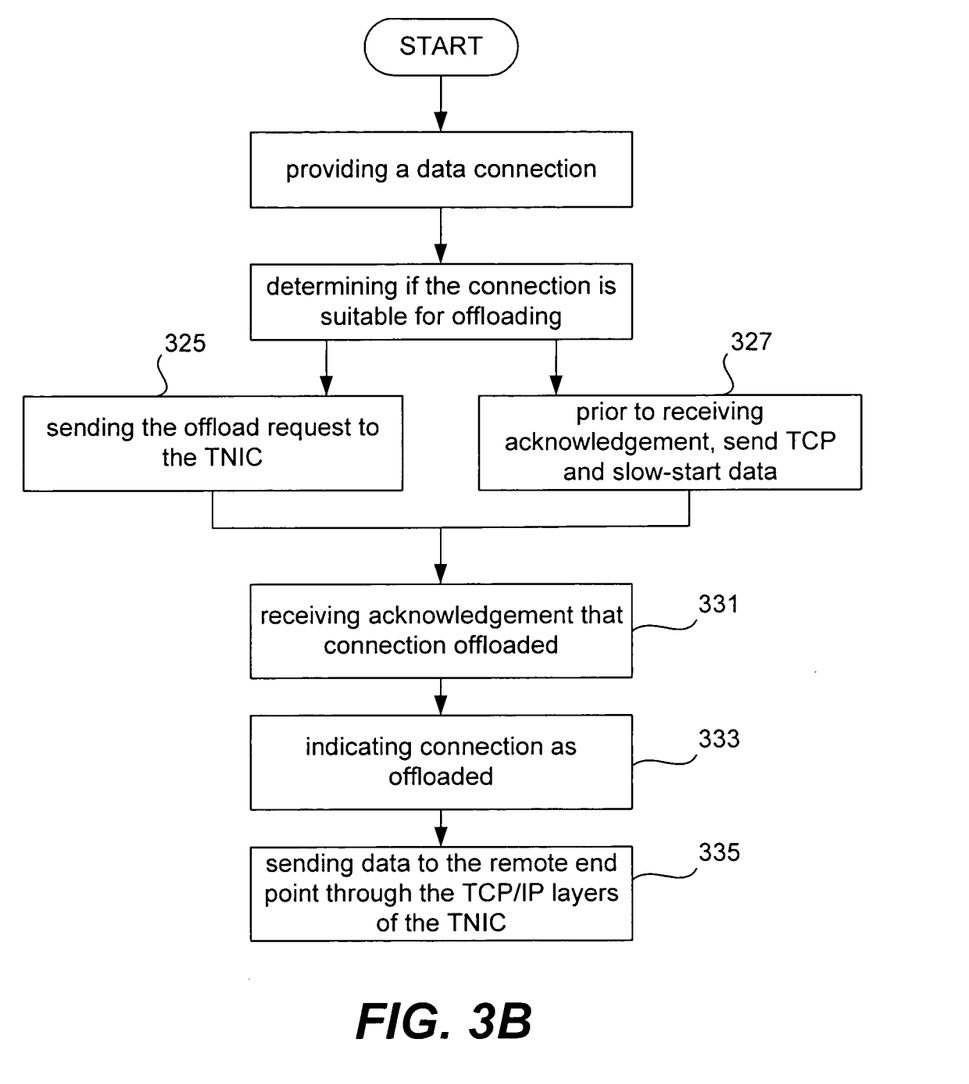
FIG. 3B is a flow diagram that describes one method embodiment for offloading a connection in accordance with one embodiment of the present invention.

FIG. 3B is a simplified flow diagram illustrating one method embodiment for offloading a data connection from a kernel onto an associated TNIC. In the depicted embodiment, the method involves providing a data connection enabling a message stream to be transmitted between a local TCP endpoint and a remote TCP endpoint (Step 321). Typically, the connection is established in accordance with standard data transmission protocols known to those of ordinary skill. For example, a 3-way handshake exchanging the requisite state and connection data is completed to establish the connection. A determination is made that the connection is suitable for offloading from the kernel onto the TNIC for processing (Step 323). In one implementation, a heuristic data analysis is performed on the data to determine whether it is suitable for offloading (e.g., the connection is long-lived enough). Many techniques for analyzing a data stream known to those having ordinary skill in the art can be employed. For example, if the data connection includes more than about seven (7) message packets it can be suitable for offloading. Then an offload request (OFR) is sent from the kernel to the TNIC (Step 325). The request typically including connection state information and a request that the connection be offloaded from the kernel to the TNIC. Prior to receiving an acknowledgement from the TNIC that the offload request was received (by the TNIC), an initial transmission of data from the kernel to the remote TCP endpoint is sent (Step 327). Typically, the kernel sends an initial transmission through its own TCP/IP stack without taking advantage of the TNIC network protocol stack (i.e., using the TNIC as an ordinary NIC). And the initial transmission comprises at least a portion of the message stream. As alluded to previously, this initial transmission comprises the few packets comprising the initial data of the TCP slow start protocol.

Additionally, the kernel can receive an acknowledgement from TNIC that connection has been offloaded onto the TNIC (Step 331). The connection can then be indicated as offloaded from the kernel onto the TNIC (Step 333).

As is known to those having ordinary skill in the art, such acknowledgement from the TNIC can be implemented in either synchronous or asynchronous notification modes. Additionally, further portions of the message stream can be sent to the remote endpoint through the TCP/IP stack of the TNIC (Step 335). The message stream data sent from the remote endpoint is then received and processing with the TCP/IP stack of the TNIC which transmits the data to the local endpoint (e.g., an application).

Figure 4:
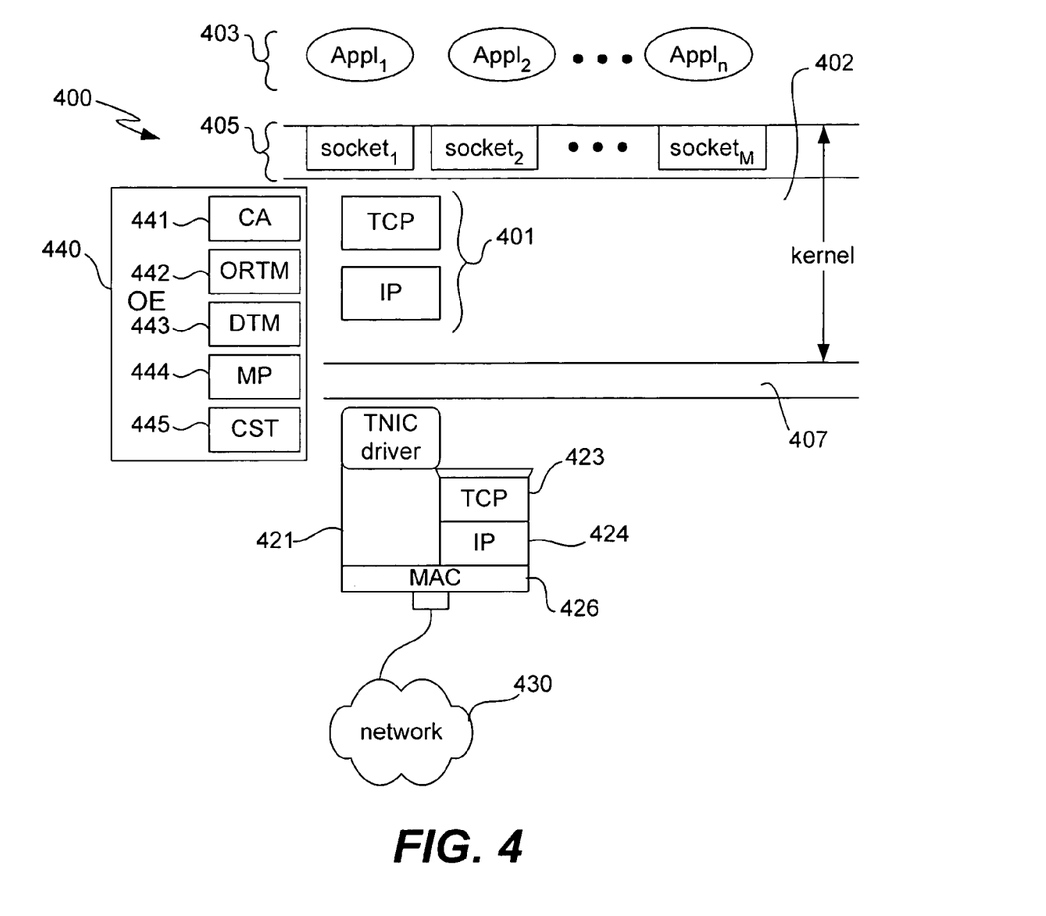
FIG. 4 depicts a computer system embodiment enabling the implementation of connection offloading in accordance with the principles of the invention.

FIG. 4 is a simplified schematic block diagram illustrating some elements of a computer system 400 embodiment having a data connection enabling message streams to be transmitted between a local TCP endpoint and a remote TCP endpoint. The system includes at least one central processing unit (CPU) having a TCP/IP stack operating in a CPU kernel 402. The system includes applications ($Appl_1$, $Appl_2$, .... $Appl_n$, and so on) arranged in an application layer 403. The applications interface with a system kernel 402 using sockets ($socket_1$, $socket_2$, ... $socket_M$, and so on) of a socket layer 405. The kernel 402 can interface with external links (e.g., a TNIC 421) using, for example, a data link provider interface 407. The system includes connections with a network 430 environment. Typical examples include the Internet or other types of networks.

The system includes a TNIC 421 including a TNIC network stack having a TNIC TCP layer 423 and a TNIC IP layer 424 configured to enable processing of data sent to and received from remote endpoints (e.g., computer systems operating remotely over a network 430). Typically the TNIC includes a media access controller (MAC) 426 enabling communication with the network 430. The MAC 426 enables data connections that allow message streams to be transmitted between a local TCP endpoint (e.g., a local application or the kernel) and a remote TCP endpoint (e.g., accessed over a network 430). The TNIC can also include a discriminator which can be used to direct message packets through the TNIC TCP/IP stack (423, 424) for processing or alternatively, to direct message packets through the kernel TCP/IP stack 401 for processing.

The system includes a TCP offload engine 440 configured to offload data connections from the kernel 402 onto the TNIC 421. The offload engine 440 is depicted in simplified block form and includes a connection analyzer 441 for determining that the connection is suitable for offloading from the kernel onto the TNIC for processing. An offload request transmission mechanism 442 provides for sending an offload request (OFR) from the kernel 402 to the TNIC 421. Typically, such OFR include connection state information and a request that the connection be offloaded from the kernel 402 to the TNIC 421. A data transmission mechanism 443 is provided for sending an initial transmission of data from the kernel 402 to the remote TCP endpoint, prior to receiving an acknowledgement of an OFR from the TNIC, wherein the initial transmission comprises at least a portion of the message stream. Additionally, the data transmission mechanism can be configured to send other portions of the message stream from the local TCP endpoint through the TCP/IP stack of the TNIC to a remote endpoint.

The offload engine 440 can further include a message processor 444 enabling message stream data sent from the remote endpoint and processing by the TCP/IP stack 423, 424 of the TNIC 421 to be received. Also, a connection status tracker 445 can be implemented to track the off-load status of various connections with the system. The connection status tracker 445 can receive acknowledgements from TNIC 421 that connections have been offloaded onto the TNIC 421 and for tracking a connection as offloaded from the kernel to the TNIC.

Figure 5A:
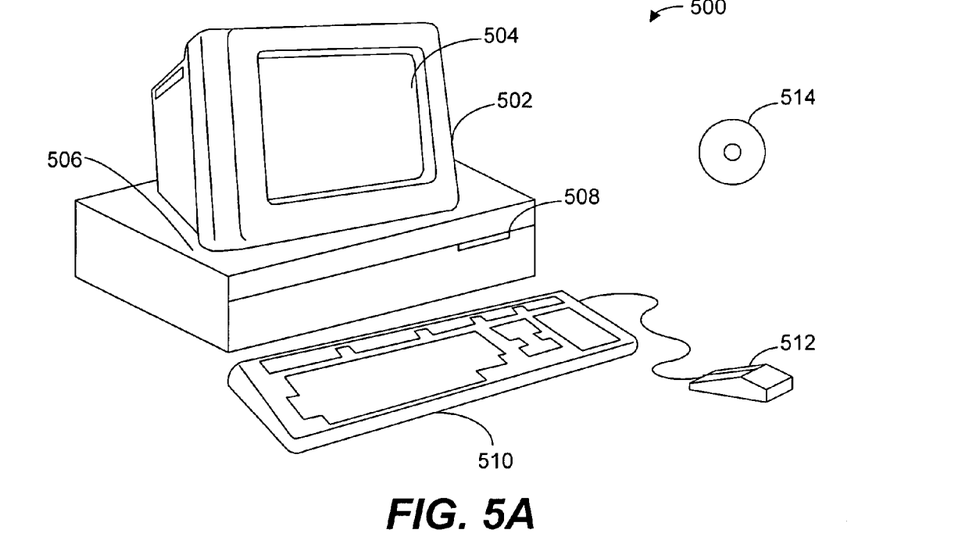
FIGS. 5A and 5B illustrate an example of a computer system that may be used in accordance with the invention.
Figure 5B:
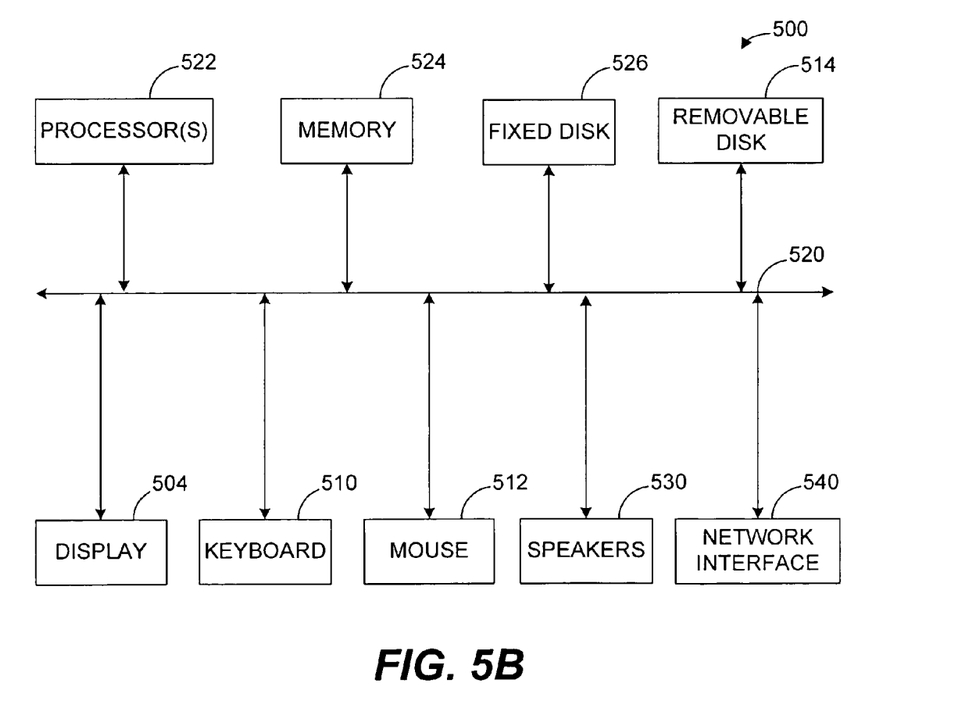

FIGS. 5A and 5B illustrate an example of a computer system 500 that may be used in accordance with the invention. FIG. 5A shows a computer system 500 that includes a display 502, screen 504, cabinet 506, keyboard 510, and mouse 512. Mouse 512 may have one or more buttons for interacting with a graphical user interface. Cabinet 506 can house a CD-ROM drive 508, system memory and a hard drive (see FIG. 5B) which may be utilized to store and retrieve software programs incorporating computer code that implements the invention, data for use with the invention, and the like. Although CD-ROM 508 is shown as an exemplary computer readable storage medium, other computer readable storage media including floppy disk, DVD, tape, memory sticks, flash memory, system memory, and hard drive may be utilized. Additionally, a data signal embodied in a carrier wave (e.g., in a network including the Internet) may be the computer readable storage medium. In one implementation, an operating system for the computer system 500 is provided in the system memory, the hard drive, the CD-ROM 508 or other computer readable storage medium and serves to incorporate the computer code that implements the invention. It is to be remembered that the operating system can be configured so it controls all of the processors of the system. It should be noted that other devices (e.g., printers, scanners, etc.) may be present in the computer system 500.

FIG. 5B shows a system block diagram of computer system 500 used to execute the software of an embodiment of the invention. The computer system 500 includes monitor 504, keyboard 510, and mouse 512. Computer system 500 further includes subsystems, such as a plurality of central processors (CPU's) 522 (including cache memory resources), system memory 524, fixed storage 526 (e.g., hard drive), removable storage 514 (e.g., CD-ROM drive), display adapter, sound card and speakers 530, and network interface 540. The network interface can be used to facilitate connection with many different network structures including the Internet. The central processors 551, for example, can execute computer program code (e.g., an operating system) to implement the invention. An operating system is normally (but not necessarily) resident in the system memory 524 during its execution. Other computer systems suitable for use with the invention may include additional or fewer subsystems. Importantly, the principles of the invention can specifically be implemented on networked computer systems having many individual computers. Such networked systems can include local area networks (LAN's) or a wide area network (WAN's). Particularly, the inventors contemplate computer systems and message traffic operating over the Internet. Additionally, an example of a LAN is a private network used by a mid-sized company with a building complex. Publicly accessible WAN's include the Internet, cellular telephone network, satellite systems and plain-old-telephone systems (POTS). Examples of private WAN's include those used by multinational corporations for their internal information system needs. The network may also be a combination of private and/or public LANs and/or WANs.

The system bus architecture of computer system 500 is represented by arrows 520. However, these arrows are illustrative of any interconnection scheme serving to link the subsystems. For example, a local bus could be utilized to connect the central processor to the system memory and display adapter. Computer system 500 shown in FIG. 5B is but an example of a computer system suitable for use with the invention. Other computer architectures having different configurations of subsystems may also be utilized.

The invention can use a combination of hardware and software components. The software can be embodied as computer readable code (or computer program code) on a computer readable medium. The computer readable medium is any data storage device that can store data which can thereafter be read by a computer system. Examples of the computer readable medium include read-only memory, random-access memory, CD-ROMs, magnetic tape, and optical data storage devices. The computer readable medium can also be distributed over a network coupled computer systems so that the computer readable code is stored and executed in a distributed fashion.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for offloading a data connection from a CPU kernel onto an associated TNIC, the method comprising:
 providing a data connection, wherein the data connection is established to enable a message stream to be transmitted between a local TCP endpoint and a remote TCP endpoint, wherein the message stream comprises a stream of data;
 determining that the data connection is suitable for offloading from the kernel onto the TNIC for processing;
 initializing a transmission of the message stream to the remote TCP endpoint;
 transmitting the message stream to the remote TCP endpoint using the data connection; and
 after transmitting at least one packet of the message stream to the remote TCP endpoint using the data connection:
  sending an offload request (OFR) from the kernel to the TNIC, wherein
 the OFR request comprises connection state information and a request that the data connection be offloaded from the kernel to the TNIC, wherein the message stream is being transmitted using the data connection while the OFR is being processed.

2. The method of claim 1 wherein the message stream comprises an internet message stream.

3. The method of claim 1 wherein the message stream includes a message stream transmitted over the internet.

4. The method of claim 1 wherein transmitting the message stream to the remote TCP endpoint comprises using the kernel.

5. The method of claim 1 wherein the method further comprises:
receiving acknowledgement from the TNIC that connection has been offloaded onto the TNIC; and
indicating the data connection as offloaded from the kernel onto the TNIC.

6. The method of claim 5 wherein said acknowledgement from the TNIC that the connection has been offloaded is transmitted to the kernel from the TNIC using one of a group consisting of a synchronous notification and an asynchronous notification.

7. The method of claim 5 wherein the method further comprises:
while transmitting the message stream from the local TCP endpoint through the TCP/IP stack of the TNIC to the remote endpoint:
receiving data from the message stream from the remote endpoint by the TNIC; and
processing the receiving message stream data with the TCP/IP stack of the TNIC.

8. The method of claim 7 wherein transmitting the message stream from the local TCP endpoint through the TCP/IP stack of the TNIC to the remote endpoint comprises sending data in progressively increasing segment sizes as part of a TCP slow-start data transmission process.

9. The method of claim 7 wherein transmitting the message stream from the local TCP endpoint through the TCP/IP stack of the TNIC to the remote endpoint comprises sending all remaining data in the message stream.

10. The method of claim 1 wherein the connection state information sent with the OFR comprises:
a listing of data packets in the message stream comprising
a listing of the packets comprising the at least one packet sent to the remote endpoint,
a listing of the packets of the message stream that have not yet been sent to the remote endpoint,
a listing of the packets sent to the remote endpoint that have been acknowledged as received by the remote endpoint, and
a listing of the packets sent to the remote endpoint that are not yet acknowledged as received by the remote endpoint.

11. The method of claim 10 wherein the listing of data packets in the message stream sent with OFR includes sequence numbers of the data packets and data content of the data packets.

12. The method of claim 1 wherein transmitting the message stream from the kernel to the remote TCP endpoint comprises sending data packets in accordance with a TCP slow-start protocol.

13. The method of claim 1 wherein transmitting the message stream from the kernel to the remote TCP endpoint comprises sending an initial transmission in a maximum segment size of between two and four data packets.

14. The method of claim 1 wherein transmitting the message stream from the kernel to the remote TCP endpoint is executed substantially in parallel with the sending of the offloading request.

15. The method of claim 1 wherein providing the data connection includes engaging in a three-way handshake to establish communication between the remote endpoint and the local endpoint.

16. The method of claim 1 wherein determining that the data connection is suitable for offloading from the kernel onto the TNIC for processing is performed by the kernel which determines whether the data connection is suitable for processing by a TCP/IP stack of the TNIC.

17. The method of claim 16 wherein determining that the connection is suitable for offloading comprises determining whether the data connection comprises more than 25 data packets.

18. The method of claim 16 wherein determining that the connection is suitable for offloading comprises determining whether the data connection comprises more than 45 kilobytes.

19. A method for offloading a data connection from a kernel onto an associated TNIC, the method comprising:
determining that a data connection is suitable for offloading from the kernel onto the TNIC for processing, wherein the data connection is established to facilitate message streams between a local TCP endpoint and a remote TCP endpoint;
initializing a transmission of a message stream to the remote TCP endpoint;
transmitting the message stream to the remote TCP endpoint using the data connection;
after transmitting at least one packet of the message stream to the remote TCP endpoint using the data connection;
sending an offload request (OFR) from the kernel to the TNIC, wherein the OFR request comprises connection state information and a request that the data connection be offloaded from the kernel to the TNIC, wherein the message stream is being transmitted using the data connection while the OFR is being processed.

20. The method of claim 19 wherein the message stream includes a message stream transmitted over the internet.

21. The method of claim 19 further comprising:
receiving acknowledgement from the TNIC that the data connection has been offloaded on the TNIC;
indicating the data connection as offloaded from the kernel to the TNIC;
transmitting the message stream from the local TCP endpoint to the remote endpoint using a TCP/IP stack of the TNIC; and
receiving message stream data by the local TCP endpoint from the remote TCP endpoint through the TCP/IP stack of the TNIC.

22. A computer program product embodied on a computer readable media including computer program code for offloading a data connection from a kernel onto an associated TNIC, the computer program product including instructions to;
determine that the data connection is suitable for offloading from the kernel onto the TNIC for processing, wherein the data connection is established to enable a message stream to be transmitted between a local TCP endpoint and a remote TCP endpoint, wherein the message stream comprises a stream of data;
initialize a transmission of the message stream data to the remote TCP endpoint;
transmit the message stream to the remote TCP endpoint using the data connection;
after transmitting at least one packet of the message stream to the remote TCP endpoint using the data connection:
sending an offload request (OFR) from the kernel to the TNIC, wherein the OFR request comprises connection state information and a request that the data connection be offloaded from the kernel to the TNIC, wherein the message stream is being transmitted using the data connection while the OFR is being processed.

23. The computer program product of claim 22 wherein the message stream includes a message stream transmitted over the internet.

24. The computer program product of claim 22, further comprising computer program code comprising instructions to:
   transmit the message stream from the local TCP endpoint through the TCP/IP stack of the TNIC to the remote endpoint prior to receiving acknowledgement from the TNIC that the data connection as been offloaded onto the TNIC; and
   receive message stream from the remote endpoint and processing the received message stream with the TCP/IP stack of the TNIC;
   indicate the data connection as offloaded from the kernel to the TNIC.

25. The computer program product of claim 22 wherein the computer program code the instructions to transmit data from the kernel to the remote TCP endpoint are executed substantially in parallel with the instructions to send the offloading request.

26. The computer program product of claim 22 wherein the data connection is established by enabling a three-way handshake between the remote endpoint and the local endpoint.

27. The computer program product of claim 22 wherein the instructions to determine that the connection is suitable for offloading from the kernel onto the TNIC for processing are performed by the kernel which determines whether the data connection is suitable for processing by a TCP/IP stack of the TNIC.

28. The computer program product of claim 27 wherein the instructions to determine that the connection is suitable for offloading comprises determining whether the data connection comprises more than 25 data packets.

29. The computer program product of claim 27 wherein the instructions to determine that the connection is suitable for offloading comprises determining whether the data connection comprises more than 45 kilobytes.

30. A computer system having a data connection enabling message streams to be transmitted between a local TCP endpoint and a remote TCP endpoint, the system comprising:
   at least one central processing unit (CPU) comprising a TCP/IP stack operating in a CPU kernel;
   a TNIC comprising:
      a TCP/IP stack configured to enable processing of data sent to and received from remote endpoints; and
      a media access controller (MAC) that establishes a data connection that allows a message stream to be transmitted between a local TCP endpoint and a remote TCP endpoint;
   an offload engine configured to offload the data connection from the kernel onto the TNIC, the offload engine comprising:
      a connection analyzer for determining that the data connection is suitable for offloading from the kernel onto the TNIC for processing;
      a data transmission mechanism for transmitting the message stream to the remote TCP endpoint using the data connection; and
      an offload request transmission mechanism for sending an offload request (OFR) from the kernel to the TNIC, wherein the request comprises connection state information and a request that the data connection be offloaded from the kernel to the TNIC, wherein the message stream is being transmitted using the data connection while the OFR is being processed.

31. The computer system of claim 30 wherein the message stream includes a message stream transmitted over the internet.

32. The computer system of claim 30 wherein
   the data transmission mechanism is further configured to transmit the message stream from the local TCP endpoint through the TCP/IP stack of the TNIC to the remote endpoint; and
   wherein the offload engine further includes:
      a message processor enabling message stream data sent from the remote endpoint and processing with the TCP/IP stack of the TNIC to be received; and
      a connection status tracker for receiving acknowledgement from TNIC that the data connection has been offloaded onto the TNIC and for tracking the data connection offloaded from the kernel to the TNIC.

33. The method of claim 1 further comprising:
   transferring the message stream to the TNIC at a time no earlier than sending the OFR to the TNIC.

34. The method of claim 19 further comprising:
   transferring the message stream to the TNIC at a time no earlier than sending the OFR to the TNIC.

* * * * *